Jan. 13, 1925. 1,523,299

E. SCHÜRER

METHOD FOR REDUCING CROSS TALKING IN TELEPHONE PHANTOM LINES

Filed Dec. 8, 1923 2 Sheets-Sheet 1

Inventor
E. Schürer
By Mark Clark
Attys.

Patented Jan. 13, 1925.

1,523,299

UNITED STATES PATENT OFFICE.

EUGEN SCHÜRER, OF COLOGNE-MULHEIM, GERMANY.

METHOD FOR REDUCING CROSS TALKING IN TELEPHONE PHANTOM LINES.

Application filed December 8, 1923. Serial No. 679,513.

*To all whom it may concern:*

Be it known that I, EUGEN SCHÜRER, a subject of the German Republic, and residing at Genoveva Strasse 68, Cologne-Mulheim, Germany, have invented a certain new and useful Method for Reducing Cross Talking in Telephone Phantom Lines, of which the following is a specification.

This invention has reference generally to improvements in telephone systems and more particularly relates to a method for reducing cross-talking in telephone phantom lines.

The invention as its primary aim and object consists of a method in which adjustable impedances are employed for determining the balancing impedance and subsequently substituting therefor balance impedances preferably in the form of chain conductors arranged in series with and between the lines to be balanced and the apparatus at the end thereof while the other ends are short circuited or closed through suitable resistances, the chain conductors being arranged in such manner that the dependence of the real and imaginary parts of the impedance of the chain conductors are dependent upon the frequency in the same manner as the value of the corresponding parts of those found in the previously used adjustable impedances.

Other objects as well as the nature, characteristic features and scope of the invention will be more readily apparent from the foregoing description taken in connection with the accompanying drawings and pointed out in the claims.

Figure 1:
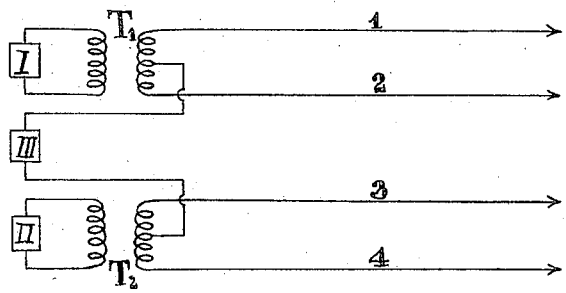
Figs. 1 to 3 illustrate the manner in which phantom lines have previously been balanced.

In Figure 1 of the accompanying drawings the one end of the phantom line constituted by the main lines (1, 2) and (3, 4) is connected to the apparatus I, II and III, the apparatus I and II being used for the two main lines and the apparatus III for the phantom line. The two ends of the latter apparatus are connected to the symmetrical centres of the transformers $T_1$ and $T_2$. The disturbance caused in the apparatus I and II by the currents derived from the apparatus III, viz, cross-talk, is due to the impedances of the branches of the pairs of conductors, considered from the centre of symmetry of the line, being different in consequence of asymmetries of capacity and inductance, so that from the points of connection of the apparatus III with the transformers the two halves of the latter are traversed by currents of different amplitude and phase.

In order to avoid this disturbance, use is at present being mainly made of a method by which the inequalities in the capacities and inductances of the conductors are balanced within or between certain sections of the line, during the installation of the latter, whereby the impedances of the branches of the line at the ends thereof are made practically equal.

Figure 2:
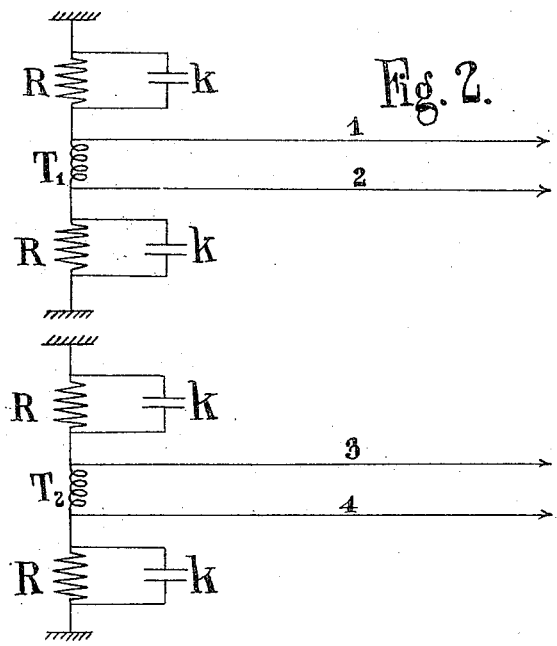

However, cases are encountered in practice, for instance in submarine telephony, in which a subsequent balancing of the lines in sections is not possible. In order to reduce cross-talk in these cases it has been proposed to effect the balancing of the ends of the lines by first of all connecting the ends of the lines to earth through impedances as indicated in Figure 2, each impedance consisting of a resistance R connected in parallel with a capacity K, and by adjusting the resistances and capacities for the individual frequencies within the range of frequencies of the balancing to such values that for the adjustment corresponding to each frequency the total impedances connected to the two halves of the transformer become equal to each other, which was indicated by the disappearance of the cross-talk disturbance at the particular frequency. Some of the values of the resistance and capacity obtained by these adjustments vary considerably with the frequency. In order to reduce talk in the whole range of frequency, the resistances and capacities would have to be replaced by impedances, the real and imaginary parts of which are dependent upon the frequencies in the manner indicated by the adjustment of the resistances and capacities.

However, it has hitherto been impossible to produce such impedances, for which reason only the greatest deviations of the adjusted values from their mean values were taken into consideration and use was made of end connections consisting not of adjusted impedances $$\frac{R}{1+i\omega K.R}$$

but of a series of resonance circuits connected in series with one another, each of which produced at its particular resonance point one of these greatest deviations.

This method effected a very inaccurate balancing. In addition thereto the earthing at the ends of the line over the comparatively small resistances of these end connections had also certain technical disadvantages.

Figure 3:
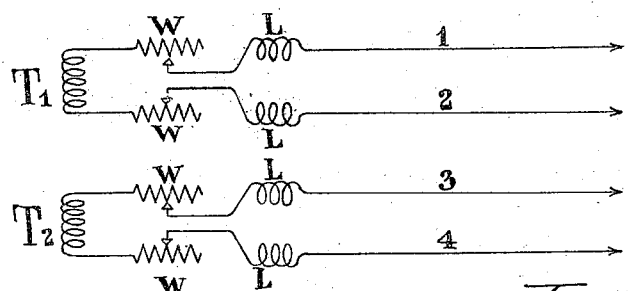

It has been endeavored to avoid these disadvantages by inserting the adjusted or balance impedances in series between the ends of the lines and the apparatus provided at the ends of the lines (transformers). For this purpose use has been made of adjusted impedances which, as shown in Figure 3, consist of an adjustable resistance W and an adjustable self-inductance L (variometer). By adjusting these adjustable members so that they shall cause the cross-talk to be practically negligible for every frequency, we obtain those real and imaginary additional values, by which the components of the impedances of the two branches of the line are completed to equal values for the individual frequencies.

In order to obtain balance impedances which are to be used in the place of the adjusted impedances and the real and imaginary parts of which depend upon the frequency in the same manner as the adjusted values of the resistance and self-inductance, it is assumed, according to the invention, that the irregularities in the impedance of the branches of the line producing the cross-talk have to be considered as being caused by additional irregularities being superposed upon uniformly distributed properties of the lines and that these irregularities by themselves may be considered as an irregular artificial line, which at its inlet terminals shows that the real and imaginary parts of its impedance are dependent upon the frequency in a manner which is substantially complementary to the manner in which the adjusted resistance and self-inductance of the adjusted impedances are dependent upon the frequency. According to this, the adjusted impedances can be imitated as regards the manner of their dependence upon the frequency by irregular artificial lines, which can then be substituted for the adjusted impedances.

Figure 4:
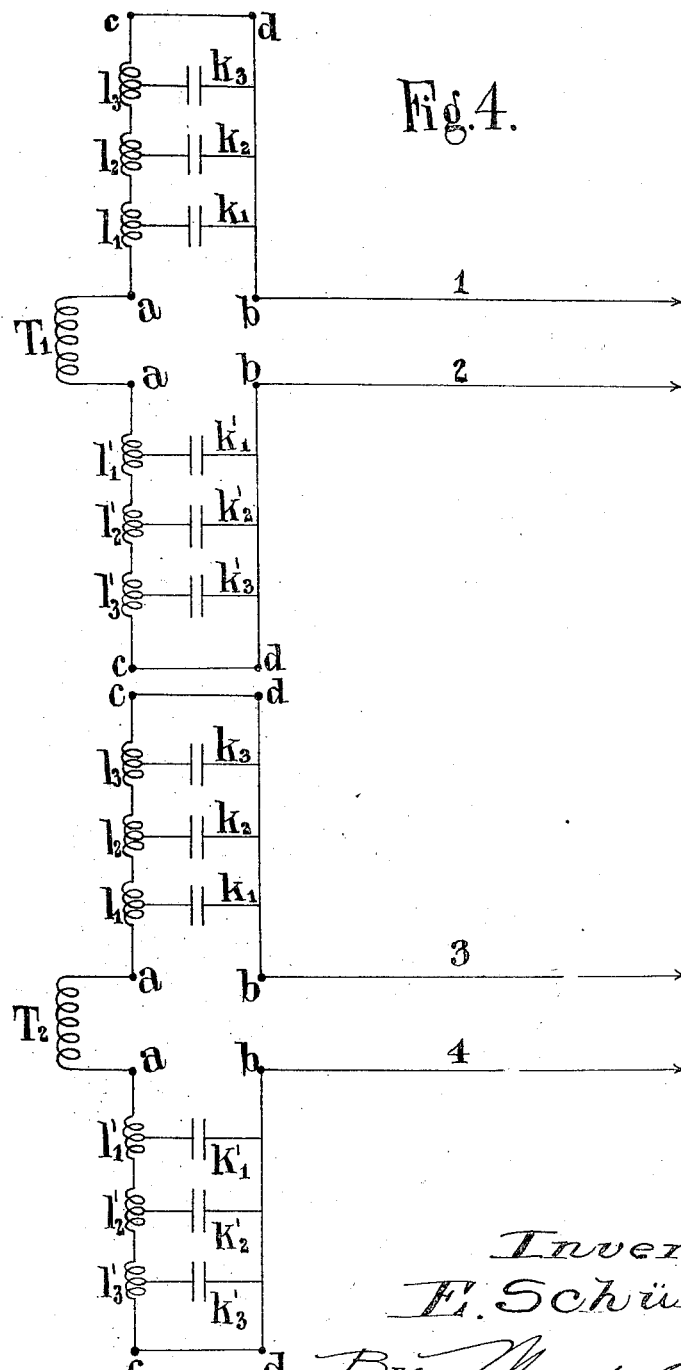
Fig. 4 illustrates the method for balancing lines which constitutes my invention.

According to the invention use is made of balance impedances, which, as shown in Figure 4, are connected with their inlet terminals $a\ b$ in the place of the previously used adjusted impedances in series between the lines and the apparatus at the ends thereof, and which are short-circuited or closed over suitable resistances at their rear ends.

The form of these chain conductors is immaterial and any of the well-known arrangements of chain conductors may be used. The number and irregularity of the members and member elements of these chain conductors are so chosen that the dependence of the real and imaginary part of the impedance of the chain conductors on the frequency follows a curve, which is identical with or similar to that found for the corresponding parts of the adjusting impedances when adjusted.

The artificial lines referred to may be of any form; any known arrangement of artificial line may be used for the purpose of the present invention. In the arrangement illustrated, by way of example, in Figure 4, the artificial lines used as balance impedances comprises three members each of which consists of a self-inductance (for instance $l_1$, $l_2$, $l_3$, $l'_1$, $l'_2$ or $l'_3$) and a capacity (for instance $k_1$, $k_2$, $k_3$, $k'_1$, $k'_2$ or $k'_3$). The required numbers of members and the required values for the individual $l_1 \ldots l'_3$ and $k'_1 \ldots k'_3$ are first of all found out in an artificial line having a variable number of members and adjustable $l$ and $k$ by varying them until the real and imaginary parts of the impedance of the artificial line show that they are dependent upon the frequency in substantially the same manner as was previously ascertained by the adjustment of the adjusted impedances. The fixed artificial lines to be inserted as balance impedances are then constructed for each line in such a manner that the number of their members and the values of $l$ and $k$ are the same as those found with the adjustable artificial line.

What I claim is:—

A method of balancing telephone phantom lines for reducing cross-talking consisting in determining by adjustable impedances the desired balance impedance and substituting a plurality of chain conductors in series with the lines in such a manner that the dependence of the real and imaginary parts of the impedance of the chain conductors on the frequency follows a curve which is substantially similar to the previously employed adjustable impedances.

In testimony whereof I have signed my name to this specification.

EUGEN SCHÜRER.